(12) United States Patent
Nagorski et al.

(10) Patent No.: US 9,143,718 B2
(45) Date of Patent: *Sep. 22, 2015

(54) METHOD AND APPARATUS FOR SELECTION OF CONTENT FROM A STREAM OF DATA

(71) Applicant: Gracenote, Inc., Emeryville, CA (US)

(72) Inventors: Igor A Nagorski, Geldrop (NL); Jan A Nesvadba, Eindhoven (NL); Ronaldus M Aarts, Geldrop (NL)

(73) Assignee: Gracenote, Inc., Emeryville, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/778,439

(22) Filed: Feb. 27, 2013

(65) Prior Publication Data

US 2013/0302011 A1    Nov. 14, 2013

Related U.S. Application Data

(63) Continuation of application No. 11/573,455, filed as application No. PCT/IB2005/052642 on Aug. 9, 2005, now Pat. No. 8,406,607.

(30) Foreign Application Priority Data

Aug. 12, 2004    (EP) .................................. 041039025

(51) Int. Cl.
*H04N 9/80* (2006.01)
*H04N 5/50* (2006.01)
(Continued)

(52) U.S. Cl.
CPC ............... *H04N 5/50* (2013.01); *H04N 19/467* (2014.11); *H04N 21/235* (2013.01);
(Continued)

(58) Field of Classification Search
None
See application file for complete search history.

(56) References Cited

U.S. PATENT DOCUMENTS

| 4,677,466 A | 6/1987 | Lert, Jr. et al. |
| 6,658,423 B1 | 12/2003 | Pugh et al. |

(Continued)

FOREIGN PATENT DOCUMENTS

| EP | 0838960 A2 | 4/1998 |
| EP | 1089560 A1 | 4/2001 |

(Continued)

OTHER PUBLICATIONS

"U.S. Appl. No. 11/573,455, Final Office Action mailed Mar. 15, 2012", 12 pgs.

(Continued)

*Primary Examiner* — Heather Jones
(74) *Attorney, Agent, or Firm* — Schwegman Lundberg & Woessner, P.A.

(57) ABSTRACT

A main stream contains successive content elements of video and/or audio information that encode video and/or audio information at a first data rate. A computation circuit (144) computes main fingerprints from the successive content elements. A reference stream is received having a second data rate lower than the first data rate. The reference stream defines a sequence of the reference fingerprints. A comparator unit (144) compares the main fingerprints with the reference fingerprints. The main stream is monitored for the presence of inserted content elements between original content elements, where the original content elements have main fingerprints that match successive reference fingerprints and the inserted content elements have main fingerprints that do not match reference fingerprints. Rendering of inserted content elements to be skipped. In an embodiment when more than one content element matches only one is rendered. In another embodiment matching is used to control zapping to or from the main stream. In another embodiment matching is used to control linking of separately received mark-up information such as subtitles to points in the main stream.

28 Claims, 3 Drawing Sheets

(51) Int. Cl.

| | |
|---|---|
| *H04N 21/2343* | (2011.01) |
| *H04N 21/235* | (2011.01) |
| *H04N 21/2368* | (2011.01) |
| *H04N 21/2389* | (2011.01) |
| *H04N 21/254* | (2011.01) |
| *H04N 21/41* | (2011.01) |
| *H04N 21/434* | (2011.01) |
| *H04N 21/435* | (2011.01) |
| *H04N 21/4385* | (2011.01) |
| *H04N 21/8549* | (2011.01) |
| *H04N 19/467* | (2014.01) |

(52) U.S. Cl.
CPC ...... *H04N 21/2368* (2013.01); *H04N 21/2389* (2013.01); *H04N 21/23892* (2013.01); *H04N 21/234363* (2013.01); *H04N 21/234381* (2013.01); *H04N 21/2541* (2013.01); *H04N 21/4135* (2013.01); *H04N 21/435* (2013.01); *H04N 21/4341* (2013.01); *H04N 21/4385* (2013.01); *H04N 21/8549* (2013.01)

(56) References Cited

U.S. PATENT DOCUMENTS

| | | | |
|---|---|---|---|
| 6,782,186 | B1 | 8/2004 | Covell et al. |
| 8,406,607 | B2 | 3/2013 | Nagorski et al. |
| 8,726,400 | B1 * | 5/2014 | Granstrom et al. ............. 726/26 |
| 2001/0014210 | A1 | 8/2001 | Kang |
| 2001/0051037 | A1 | 12/2001 | Safadi et al. |
| 2002/0046178 | A1 | 4/2002 | Morito et al. |
| 2002/0176702 | A1 | 11/2002 | Frantz |
| 2003/0019527 | A1 | 1/2003 | Oppermann |
| 2003/0081939 | A1 | 5/2003 | Kim et al. |
| 2003/0093790 | A1 | 5/2003 | Logan et al. |
| 2003/0126276 | A1 | 7/2003 | Kime et al. |
| 2004/0240562 | A1 | 12/2004 | Bargeron et al. |
| 2005/0015795 | A1 | 1/2005 | Iggulden |
| 2009/0226148 | A1 | 9/2009 | Nesvadba et al. |
| 2010/0158488 | A1 | 6/2010 | Roberts et al. |

FOREIGN PATENT DOCUMENTS

| | | | |
|---|---|---|---|
| GB | 2386807 | A | 9/2003 |
| WO | WO-0111865 | A1 | 2/2001 |
| WO | WO-2004019527 | A1 | 3/2004 |
| WO | WO-2005006758 | A1 | 1/2005 |

OTHER PUBLICATIONS

"U.S. Appl. No. 11/573,455, Non Final Office Action mailed Mar. 31, 2011", 14 pgs.

"U.S. Appl. No. 11/573,455, Non Final Office Action mailed Sep. 19, 2011", 12 pgs.

"U.S. Appl. No. 11/573,455, Notice of Allowance mailed Nov. 28, 2012", 8 pgs.

"U.S. Appl. No. 11/573,455, Response filed Jun. 27, 2011 to Non Final Office Action mailed Mar. 31, 2011", 13 pgs.

"U.S. Appl. No. 11/573,455, Response filed Oct. 8, 2012 to Final Office Action mailed Mar. 15, 2012", 11 pgs.

"U.S. Appl. No. 11/573,455, Response filed Dec. 15, 2011 to Non Final Office Action mailed Sep. 19, 2011", 9 pgs.

"European Application Serial No. 05773404.8, Office Action mailed Jul. 21, 2008", 3 pgs.

"European Application Serial No. 05773404.8, Office Action mailed Jul. 24, 2009", 6 pgs.

"European Application Serial No. 05773404.8, Office Action mailed Oct. 5, 2007", 4 pgs.

"European Application Serial No. 05773404.8, Response filed Jan. 20, 2009 to Office Action mailed Jul. 21, 2008", 9 pgs.

"European Application Serial No. 05773404.8, Response filed Apr. 15, 2008 to Office Action mailed Oct. 5, 2007", 12 pgs.

"European Application Serial No. 05773404.8, Response filed Nov. 6, 2009 to Office Action mailed Jul. 24, 2009", 15 pgs.

"International Application Serial No. PCT/IB2005/052642, International Preliminary Report on Patentability mailed Feb. 13, 2007", 7 pgs.

"International Application Serial No. PCT/IB2005/052642, International Search Report mailed Dec. 28, 2005", 3 pgs.

"International Application Serial No. PCT/IB2005/052642, Written Opinion mailed Dec. 28, 2005", 6 pgs.

* cited by examiner

METHOD AND APPARATUS FOR SELECTION OF CONTENT FROM A STREAM OF DATA

This application is a Continuation of U.S. application Ser. No. 11/573,455, filed on Feb. 9, 2007, which claims priority to International Application Serial No. PCT/IB2005/052642, filed on Aug. 9, 2005 and published as WO 2006/018790, which claims priority to EP application Serial No. 04103902.5, filed on Aug. 12, 2004, which applications and publication are incorporated herein by reference in their entirety.

The invention relates to a method and apparatus for selection of content from a stream of data, in particular video and/or audio data, that has been distributed for example by means of broadcasting. More particularly, according to one aspect, the invention relates to a method and apparatus for replay of a stream of data, in particular video and/or audio data, that has been edited after it has been distributed. According to one aspect, the invention relates to a method and apparatus for channel switching (zapping).

Television broadcasts typically contain successive items of content. Examples of items of content are motion pictures, sports game registrations, talk shows etc. Video recording equipment has been designed to record and replay selected items from such broadcasts, typically by means of selection under control of a timer. A well-known problem of timer controlled recording is that does not take account of unpredicted delays of the broadcast of an item, unpredicted extension of the item etc. Moreover, timer controlled recording inevitably also records commercials that have been inserted in the stream, and repetitions of brief preceding parts of the selected item immediately after commercials.

A number of improvements over timer based recording and replay have been suggested in the prior art. US patent application No 20010051037, for example, discloses how automated access to an electronic program guide can be used to enable a recorder to select the start and end times of a recording more accurately. When the electronic program guide is updated with information about broadcast delays and time extensions of a content item, the recorder that is programmed to record the item can adapt the start and end times accordingly. An electronic program guide is an example of the use of an index table for a broadcast stream with pointers to time points in the stream where the content changes.

Another solution proposed by US patent application No 20010051037 is the use of mark up tags in the broadcast stream itself, from which the recorder can determine the start and end of an item of content. US patent application No. 20020176702 similarly uses the use of identifiers in the broadcast stream, which can also be used to eliminate recording of commercials.

These solutions have the problem that the broadcaster must provide additional information that is dedicated to abnormal access to the stream, in the form of an index table (e.g. a real-time updated electronic program guide) or mark up tags. Errors in this additional information, as well as failure to provide proper timing, can significantly affect recording. Moreover, the broadcaster may be reluctant to provide this information because it is merely overhead, or because it only reduces attractiveness of the television channel for advertisers. The same kinds of problems occur when the data is distributed for example on disk.

In addition to recording and replay additional information may have use for other applications, such as automated intelligent zapping or mark up of video information. An apparatus that supports automated intelligent zapping may for example be designed to skip channels that are broadcasting commercials or to zap back to an original channel once broadcast of an original item of video information is resumed on that channel For this purpose the same type of information is needed as for selective recording, suffering from the same problems if that information is not accurate.

Mark up of video information may involve adding subtitles, alternative language audio information, chapter markers, menu's, premium content etc. For this purpose the same type of information is needed as for selective recording, suffering from the same problems if the information is inaccurate.

From PCT patent application No 2004019527 (assigned to the same assignee as the present patent application) it is known to trigger a video recorder by means of digital fingerprint matching (the fingerprints being called "signatures" in this publication). PCT patent application No 2004019527 gives examples of fingerprint computation techniques. As used herein, "fingerprint" refers to information that is obtained from a signal (or signal part) that represents video and/or audio content, so that the fingerprint is substantially affected by factors that determine the perceptive impression when a human viewer and/or listener when the video and/or audio content perceives content. Thus, the fingerprint is to a large extent unique for the perceived content. In this sense a fingerprint as used herein differs from a watermark in video and/or audio signals in that a watermark is independent on the perceptive content.

The recording method of PCT patent application No 2004019527 is based on the observation that content items on television often start with the same introductory images, called the "intro". A fingerprint of an example of the intro is computed and fingerprints of an incoming video stream are computed and compared with the fingerprint of the intro. When a match is found the recorder is started.

PCT patent application No 2004019527 describes use of fingerprint to search for intros in recorded material, to facilitate selective replay. However these known fingerprint method are limited to content that is preceded by a known intro. Selection of content is limited to the point at the start of programs which contains standard imagery.

Among others it is an object of the invention to enable fine grained selection of insertions in a video and/or audio stream after the stream has been distributed with the insertions, preferably from a broadcast stream, without requiring a table of addresses in the stream from the distributor or mark up tags in the stream.

Among others it is an object of the invention to enable substantially seamless reconstruction of an item of video and/or audio information that is distributed in a video and/or audio stream intermixed with other video and/or audio data.

Among others it is an object of the invention to enable intelligent zapping among a plurality of video and/or audio streams that are broadcast simultaneously, without requiring a table of addresses in the stream from the distributor or mark up tags in the stream.

Among others it is an object of the invention to support mark-up of video and/or audio streams that is broadcast.

An apparatus and method according to the invention are set forth in the independent Claims. According to the invention fine grained matching of fingerprints (in the sense defined in the preceding) for a main stream of video and/or audio data is made possible by the supply of an additional reference stream which defines a series of fingerprints and a sequence order of these fingerprints. The reference stream may be distributed in the form of a file, for example. The reference stream corresponds to a core of the main stream (e.g. a motion picture), but not to inserted sections in the main stream (e.g. commercials) that do not correspond to the core of the main stream. The reference stream usually has a lower data rate than the main stream. That is, the amount of data used for corresponding rendering time intervals is lower in the reference stream than in the main stream. In one embodiment, the reference stream is a low (temporal or spatial) resolution version of the main stream without commercials. In this case reference fingerprints can be computed from the video and/or audio content of the reference stream and their sequence can be derived from the sequence of the reference stream. In another embodiment the reference stream contains the reference fingerprints directly.

The supply of this type of reference stream makes it possible to edit the main stream. Since the reference stream may have a much lower data rate than the main stream, the reference stream can be "sold" to enable improved quality access to the main stream without the need to redistribute a stream at the high data rate of the main stream. Preferably the fingerprints of the main stream and the reference stream are matched according to their respective positions in the main stream and the reference stream. That is, a main fingerprint obtained for a particular content element from the main stream is detected to match if it substantially equals a particular reference fingerprint obtained from the reference stream and a main fingerprint for a further content element from the main stream that is temporally adjacent to the particular content element also matches.

In an embodiment the reference stream is also used to detect duplication of content in the main stream, such as for example just in front and after an inserted commercial. In this way it can be ensured that only one copy of the duplicated part is rendered. In principle duplication can be detected simply by testing whether the same reference fingerprint matches with the fingerprint of more than one content element of the main stream. In a preferred embodiment duplication of a stream section is eliminated provided that it is detected that the section immediately precedes and follow a same section of inserted content elements (as detected by the absence of a matching fingerprint). Thus, the risk of accidental elimination of duplication is avoided.

Another application is that the reference stream may be used to support intelligent zapping, for example by skipping channels that broadcast information with fingerprints that do not match reference fingerprints, or by returning to a main channel, terminating zapping once matching fingerprints are found in the video and/or audio data of the main channel.

Another application is that the reference stream may be used to add mark up information. The mark up information, such as sub-title information, alternative language channels, menus, chapter markers, premium content etc. may be supplied in conjunction with the reference stream, so that the mark-up can be linked to positions in the reference stream that are selected by fingerprint matching. In this way a high quality stream can be constructed for individual users, without requiring the full bandwidth for transmission of the stream to be reserved for these individual users (this bandwidth is provided in a broadcast channel that is shared with other users that do not receive the mark up information).

These and other objects and advantageous aspects of the invention will be described in more detail using non-limitative examples illustrated by the accompanying Figures.

FIG. 1 shows a video and/or audio rendering system

FIG. 2 symbolically shows a broadcast stream of video and/or audio data

FIG. 3 symbolically shows a reference stream of video and/or audio data

FIG. 3*a* symbolically shows associations between time points

FIG. 4 symbolically shows an edited stream of video and/or audio data

Figure 1:
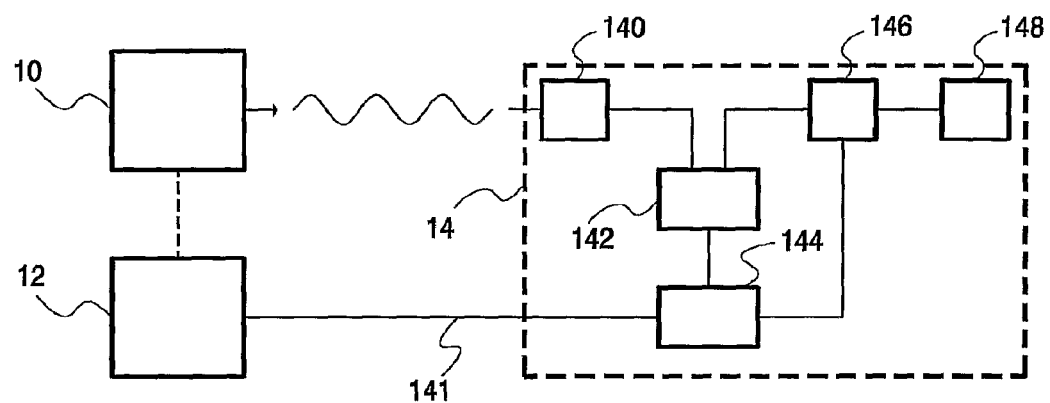

FIG. 1 shows a video and/or audio rendering system comprising a broadcast transmission apparatus 10, a reference transmission apparatus 12 and a receiver apparatus 14. Receiver apparatus 14 comprises a channel receiver 140, a storage device 142, a reference comparator 144, an editing unit 146 and a rendering unit 148 Channel receiver 140 has an input for receiving a broadcast data stream from broadcast transmission apparatus 10 and an output coupled to storage device 142. Editing unit 146 has an interface coupled to storage device 142 and an output coupled to rendering unit 148. Rendering unit 148 comprises for example a display screen and/or a loudspeaker for rendering video and/or audio information supplied by editing unit 146. Reference comparator 144 has an input 141 for receiving a reference stream from reference transmission apparatus 12, an interface to storage device 142 and an output coupled to a control input of editing unit 146.

Figure 2:
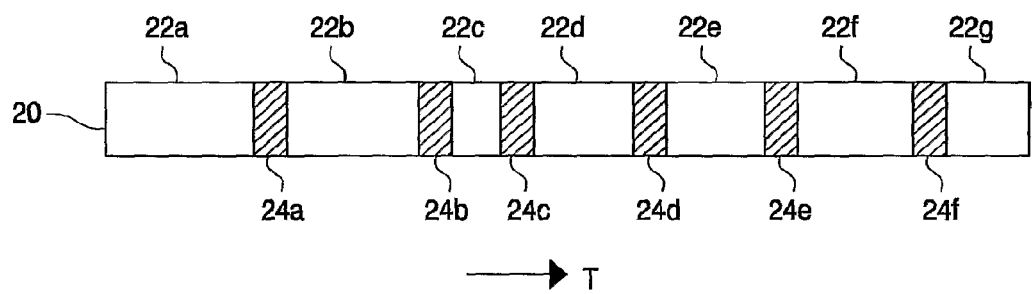

In operation broadcast transmission apparatus 10 broadcasts a stream of video and/or audio data and reference transmission apparatus 12 transmits a reference stream. FIG. 2 illustrates a broadcast stream 20 as a function of time T. The stream contains an item of video information, such as a motion picture, which has been cut into parts 22*a-g* that are broadcast temporally intermixed with other items 24*a-f* such as commercials. Ordinarily, when stream 20 is received, decoded and rendered, this would result in visual and/or acoustical rendering of the parts 22*a-g* intermixed with visual and/or acoustical rendering of the other items 24*a-f*.

Figure 3:
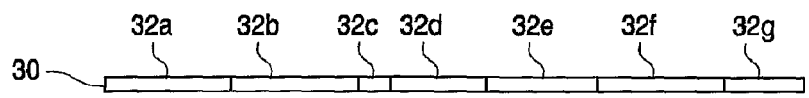

FIG. 3 illustrates a reference stream 30. The reference stream 30 is contains parts 32*a-g* that correspond to a transmits a reference signal. In contrast to the broadcast stream 20 the parts 32*a-g* are not intermixed with other items. In an embodiment, reference signal 30 contains a series of fingerprint data items, each corresponding to a fingerprint that can be computed from the video and/or audio data of a respective section of the broadcast stream 20, e.g. from video data in respective video frames, or groups of frames or time intervals of audio. In an alternative embodiment, reference stream 30 contains elements that represent the audio and/or video-encoding elements from the broadcast stream at low spatial and/or temporal resolution, without intermixed commercials. In each embodiment the information in the reference stream is constructed so that the data rate (and thereby the number of data bits that needs to be transmitted for a same time interval during rendering) in reference stream 30 is much lower than the data rate in broadcast stream 20. This indicated symbolically by the fact that the broadcast stream 20 of FIG. 2 is drawn with broader than the reference stream 30 of FIG. 2.

In operation, receiver apparatus 14 receives both broadcast stream 20 and reference stream 30. In principle the same communication medium may be used to receive both streams (e.g. from satellite or terrestrial wireless broadcast, or from a cable TV network). However, preferably different media are used, reference stream 30 being received via the Internet for example, or distributed on a data carrier like a disk. Channel receiver 140 receives the broadcast stream and stores data from that stream in storage device 142 which may contain a magnetic hard disk, a flash memory etc.

After the broadcast stream of a part of it has been stored editing unit 146 starts retrieving data from the stream from storage device 142, decodes the retrieved data to derive a video and/or audio signal and supplies the decoded signal to rendering unit 148. Editing unit 146 is arranged to skip selected parts of the broadcast stream 20, so that rendering unit 148 does not render the corresponding video and/or audio signal for those parts. Reference comparator 144 controls the selection of the parts that are skipped. Reference comparator is implemented for example as a suitably programmed programmable processor, or as a dedicated circuit.

Reference comparator 144 receives reference stream 30. In an embodiment reference stream 30 is received substantially simultaneously with broadcast stream 20, but alternatively reference stream 30 may be received earlier or later. Preferably reference comparator 144 stores the entire reference stream 30, or parts of it, or fingerprints computed from reference stream 30, for later use, for example in storage device 142 or in another memory. Alternatively reference comparator 144 may receive reference stream 30 for substantially immediate use, in which case no long-term storage of the entire reference stream 30 is needed.

During editing reference comparator 144 retrieves sections of broadcast stream 20 from storage device 142, computes fingerprints for those retrieved sections and compares these computed fingerprints with fingerprints obtained from reference stream 30. Example of fingerprint computation techniques can be found in WO2004019527. When reference stream 30 contains a series of fingerprints these fingerprints may be compared substantially directly with the computed fingerprints, but in an embodiment wherein reference stream 30 contains a low resolution version of the elements of broadcast stream 20, but no fingerprints, the fingerprints may need to be computed from the low resolution version first, before comparison.

As a result of comparison reference comparator 144 detects for which segment of broadcast stream 20 the fingerprint matches a particular fingerprint obtained from reference stream 30. In this case a time point defined by reference stream 30 is associated with the segment of broadcast stream 20 that resulted in the matching fingerprint.

Figure 3A:
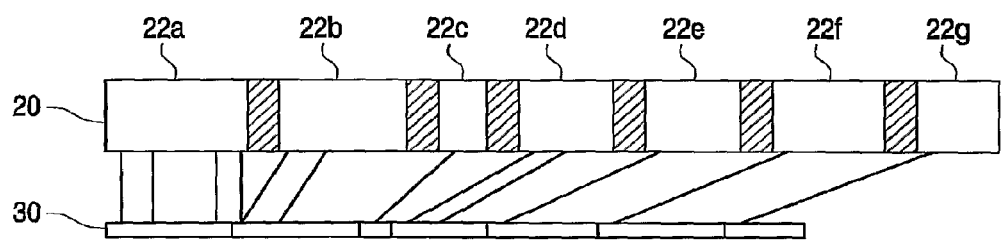

FIG. 3a uses connecting lines to symbolize the resulting association of time points defined by reference stream 30 with time points in broadcast stream 20 (typically a time points in broadcast stream 20 defines the start of a segment from which a matching fingerprint was computed or for example a video frame from which a matching fingerprint was computed). It should be understood that only a few of the associations are illustrated for the sake of clarity. Typically, there associations are detected for time points that are no more than one second apart and preferably no more than a tenth of a second apart. At one point it is shown that two time points separated by a commercial break in broadcast stream 20 are associated with one time point defined by reference stream 30. This may occur under special circumstances as will be discussed later.

The time points that have been detected to be associated in this way with broadcast stream 20 are used to control editing by editing unit 146. Typically it will be found that during parts 22a-g successive segments of broadcast stream 20 are associated with successive time points. For interruptions 24a-f no matching fingerprints will be found and a next time point will only be associated with a next part 22a-g of broadcast stream 20 after the interruption 24a-f. In an embodiment editing unit 146 selectively skips segments of the broadcast stream 20 that are not associated with time points defined by reference stream 30. In a further embodiment fingerprints are determined for sampled segments that are separated by other segments for which no fingerprint matching is performed. In this embodiment the other segments from broadcast stream 20 between segments for which matching segments were found not skipped. Other segments from broadcast stream 20 between segments for which no matching segments were found are skipped. Preferably, editing unit 146 selects the length of the skipped parts so that the remaining parts of the broadcast stream 20 will be rendered at mutual distances defined by the associate time points.

In many broadcast streams 20 in which an item of video and/or audio data is interrupted by commercials a last part of the item that precedes the commercial is repeated after the commercial. This is done to allow the viewer to regain the context after the commercial, before new video and/or audio information is rendered. In this case, it may occur that reference comparator 144 identifies two segments from broadcast stream 20 whose fingerprints match the same fingerprint obtained from reference stream 30. Preferably, it is also detected whether these duplicate segments immediately precede and follow the same inserted segment respectively. Editing unit 146 is preferably arranged to skip one of these two segments, in response to detection of such a duplication, so that the remaining parts of the broadcast stream 20 will be rendered at mutual distances defined by the associate time points.

In an embodiment, editing unit 146 includes all segments from broadcast stream 20 up to a first segment of which the fingerprint did not match a fingerprint obtained from reference stream 30 (at the start of a commercial break 24a-f). In this case the fingerprints obtained from reference stream 30 include a sequentially first subsequent fingerprint that does not match with a fingerprint computed from broadcast stream 20 for a segment at a normal time distance from a previous segment of broadcast stream 20 for which a matching fingerprint was obtained from reference stream. Reference comparator 144 searches for a subsequent segment in broadcast stream 20 (after the commercial break 24a-f) with a fingerprint that matches the sequentially first subsequent fingerprint. This corresponds to the first as yet unbroadcast information after the commercial break. Editing unit 146 skips broadcast stream 20 until this subsequent segment. In this way the commercial break and the duplicated part of the stream is eliminated.

It will be appreciated that other solutions are possible, such as skipping a last part of broadcast stream 20 before the commercial break and resuming immediately behind the commercial break from the first segment with a matching fingerprint. Other solutions may be used which skip part of the broadcast stream before and part after the commercial break as long as a substantially continuous flow of time points is realized.

Figure 4:
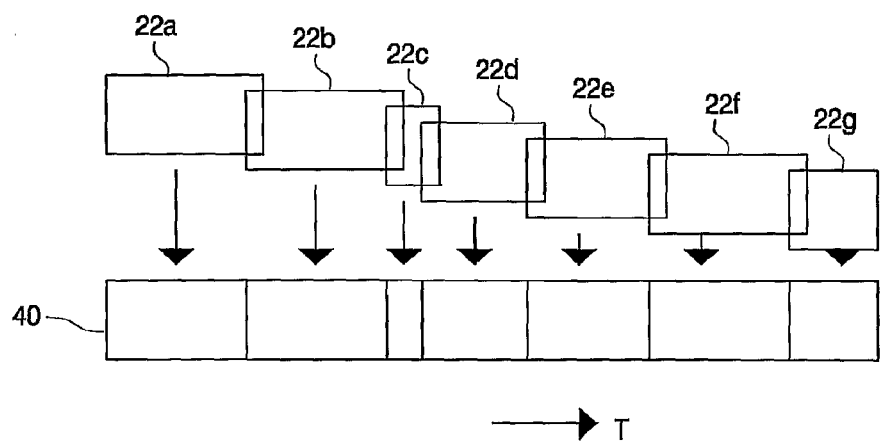

FIG. 4 illustrates composition of the output stream 40 that is supplied to rendering unit 148. Relative timing of the start of parts 22a-g of the item from broadcast stream is controlled by time points defined by reference stream 30 for matching fingerprints, and repetitions are prevented by starting successive parts 22a-g before preceding parts have been completed.

It will be appreciated that this technique is not limited to elimination of repetitions around commercial breaks. Other repetitions, for example replays during sports games may be used as well. In this case a search is made for duplicate fingerprint matches and editing unit 146 skips broadcast stream 20 from a first segment whose fingerprint matches a same fingerprint from reference stream 30 as a preceding segment from broadcast stream 20, to a first next first segment from broadcast stream 20 whose fingerprint matches a fingerprint from reference stream 30 that does a preceding segment from broadcast stream 20. Preferably, editing unit 146 is switchable between respective modes in which this type of skipping is enabled and disabled respectively. Preferably editing unit 146 is also arranged to prevent skipping if the length of time interval that is to be skipped exceeds a threshold length.

Any type of search for segments with matching fingerprints may be used. In an embodiment reference comparator 144 selects an initial position of a next segment from broadcast stream 20 for which a next fingerprint is matched to a particular fingerprint from reference stream 20 by an offset from a preceding segment with a fingerprint that matches a preceding fingerprint from the reference stream. The offset is selected equal to the time interval defined by the reference stream between the preceding fingerprint and the next fingerprint. If no match is found at the initial position new comparisons are performed for successive segments of the broadcast stream 20, until a segment is found that matches the next fingerprint from the reference stream 30. This has the advantage that no search will be performed for further fingerprints from the broadcast stream 20 that match a particular reference fingerprint, once a fingerprint for the broadcast stream has been found that matches the reference fingerprint. Thus, the risk of accidental matches is reduced.

An exception is preferably made however, if it is detected that the main fingerprint from the broadcast stream that matches the particular reference fingerprint is followed in the broadcast stream by a main fingerprint that does not match. In this case a search made for subsequent duplicate matches of the particular reference fingerprint with main fingerprints from the broadcast stream. In this way duplication of content before and after interruptions can be detected.

However, it should be understood that alternatively a search for matching fingerprints may be conducted by comparison of a fingerprints from reference stream 30 with a plurality of fingerprints for a range time points from broadcast stream 20, or vice versa by comparing a fingerprint from broadcast stream 20 with a plurality of fingerprints for a range time points from reference stream 30. This works well when the fingerprints are sufficiently unique.

In an embodiment the comparison of the fingerprints, and optionally the computation of the fingerprints is performed during rendering, while the broadcast stream 20 is read from storage device 142. For this embodiment the reference stream 30 may be supplied at a different time than broadcast stream 20, for example only during rendering. This has the advantage that edited rendering can be selectively enabled by later supply of reference stream 30, e.g. after payment of a fee, or after a lapse of time (e.g. for non-live viewing of a game of sports).

It should be understood that other embodiments are possible. For example, reference comparator 144 may be arranged to compute fingerprints and select matching time points in reference stream 30 and broadcast stream 20 in advance. In an embodiment reference comparator 144 stores information about the matching time points in an index table for use by editing unit 146 during rendering. These computations may be performed when the broadcast stream 20 is recorded or while the broadcast stream 20 is present in storage device 142.

In another embodiment the described editing on the basis of fingerprints is performed already during reception and storage of the broadcast stream 20. This reduces the amount of data that needs to be retained in storage device 142. Alternatively, editing may be performed after storage, but before rendering, by selectively deleting parts of the stored broadcast stream 20 from storage device 142.

Although these embodiments have been described for a broadcast stream 20, which has been broadcast by a broadcast transmission apparatus 10, e.g. via a terrestrial broadcast medium, or via cable or satellite broadcast, it should be understood that the described techniques can be applied to a stream that is distributed via other media, for example on an optical disk like a DVD etc. In this way the value of the distributed stream can be upgraded by supplying a reference stream, without consuming the bandwidth for a full data rate stream. Moreover, the invention is not limited to applications wherein the stream is necessarily stored.

Figure 5:
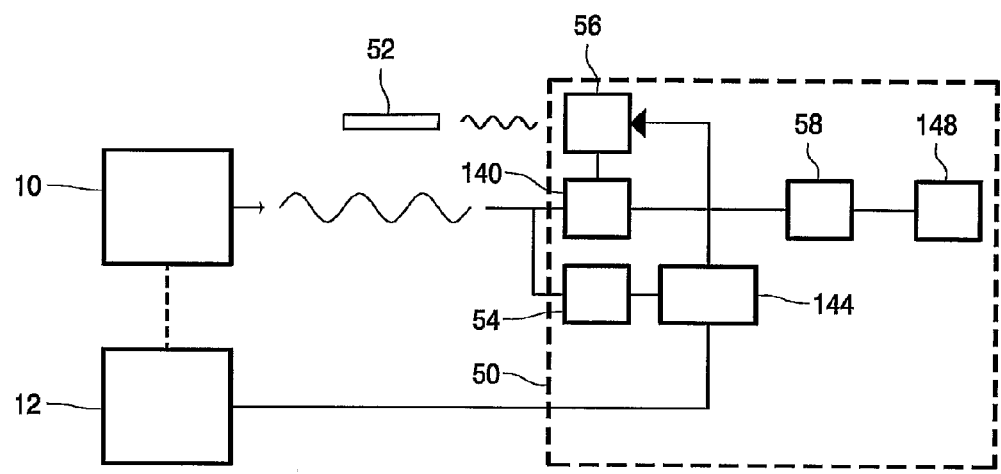
FIG. 5 shows a video and/or audio rendering system with automated zapping

FIG. 5 shows a system wherein the invention is applied to intelligent zapping. In this embodiment a reception apparatus 50 with a remote control unit 52 is used. Reception apparatus 50 contains a second channel receiver 54 and a channel selector 56. Like channel receiver 140, which will be referred to as first channel receiver 140, second channel receiver 54 is coupled to receive broadcast data. Second channel receiver 54 has an output coupled to reference comparator 144, which has an output coupled to channel selector 56. First channel receiver 140 has an output coupled to a decoder 58, which has an output coupled to rendering unit 148. Channel selector 56 has a control output coupled to first channel receiver 140. First and second channel receiver 140, 54 support tuning to different channels (or selection of different programs from a transport stream).

In operation channel selector 56 supports zapping (channel changing) under control of remote control unit 52. According to an aspect of the invention zapping is controlled dependent on the results of fingerprint matching. In one embodiment, channel selector 56 is arranged to control first channel receiver 140 to receive successive channels selected with remote control unit 52 (e.g. by pushing a channel up or down button), to predict a next channel that will be selected and to control second channel receiver 54 to receive the predicted next channel.

Reference comparator 144 then compares fingerprints computed from the broadcast stream in the predicted channel with fingerprints from a reference stream for that broadcast stream and signals to channel selector 56 whether a match is found. Upon receiving a command from remote control unit 52 to select the next channel, channel selector 56 controls first channel receiver to switch to this channel if reference comparator 144 indicates the recent presence (within a predetermined preceding time interval) of matching fingerprints. If no such fingerprints have been found channel selector 56 controls first channel receiver 140 to switch to another channel in response to the command. In this way zapping automatically skips a channel that does not match a reference stream.

In a further embodiment, channel selector 56 is arranged to respond to the absence of matching fingerprints in the predicted next channel by predicting a predicted subsequent next channel that will be selected during zapping after the predicted next channel and to cause second channel receiver 54 to receive the predicted subsequent next channel. Reference comparator 144 then compares fingerprints computed from the broadcast stream for the predicted subsequent next channel with fingerprints from a reference stream for that broadcast stream and signals to channel selector 56 whether a match is found.

This may be repeated for further predicted channels as long as no matching fingerprints are found. In this way channel selector 56 may cause more than one channel to be skipped during zapping so that the rendered channel skips to the next channels for which on reference stream is available or a reference stream is available and the recent broadcast stream contains matching fingerprints. Thus, for example, if the reference streams describe transmitted items but not commercials in those items, channel selector can cause channels that are broadcasting commercials to be skipped during zapping.

Other applications are possible. For example, in another embodiment channel selector 56 may be used to allow zapping during the time that a commercial is broadcast on a preferred channel and to switch back to the preferred channel at the end of the commercial. For this purpose embodiment channel selector 56 may be arranged to set second channel receiver 54 to a selected channel during zapping of the channel selection of first channel receiver 140 and to disable zapping and switch back channel receiver 140 to the preferred channel once a matching fingerprint is detected in the broadcast stream from the preferred channel. In a further embodiment channel selector 56 is arranged to support different zapping modes, wherein mutually different use is made of the fingerprint information.

Figure 6:
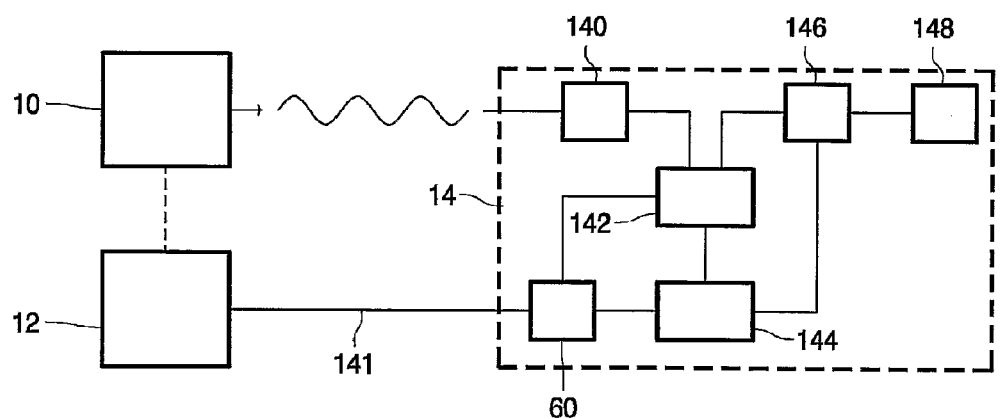
FIG. 6 shows a video and/or audio rendering system that supports mark-up

FIG. 6 illustrates an embodiment wherein reference transmission apparatus 12 also transmits mark-up information in the reference stream 30. Mark-up information as such is known for example from DVD systems and may include for example sub-title information in one or more languages, alternative audio channels, menus for accessing the stream, chapter markers, or premium video information that is not included in the broadcast. Reference transmission apparatus 12 transmits information that links the mark-up information to video information or fingerprints of the video information in the reference stream.

In the embodiment of FIG. 6 an information selection circuit 60 receives the reference stream, extracts the mark-up information and stores the mark-up information in storage device 142. Reference comparator 144 compares fingerprints for the broadcast stream with fingerprints obtained from the reference stream that reference transmission apparatus 12 has linked to an item of mark up information. When it detects a match, reference comparator 144 stores information in storage device 142 that links the relevant part of the broadcast information to the mark-up information. This may be done for example so as to construct the type of information that is contained in a DVD disk (which allows language or subtitle selection, viewing of menu's and/or chapter tables, viewing of premium content etc.) from a combination of data from the broadcast stream and the reference stream.

In the embodiment of FIG. 6 editing unit 146 may be arranged as a DVD replay controller to process the stored information basically as if it was received from a DVD disk, allowing the user to access the information interactively, to select languages or subtitles etc. Of course, other types of access (not similar to DVD access may be used).

Although the invention has been illustrated using an embodiment using a receiving apparatus 14 with different components, it will be understood that in practice the different components may be implemented using the same circuits, or using suitably programmed programmable computers to implement any or all of the functions such as fingerprint computation, matching and editing. Accordingly the invention also encompasses computer program products with instructions which when executed by such a computer make the computer perform the invention.

The invention claimed is:

1. An apparatus comprising:
a processor configured by a comparator unit to:
  receive a main datastream and a reference datastream, the main datastream including main content elements intermixed with inserted content elements, the reference datastream having a different data rate than the main datastream and including reference fingerprints of the main content elements of the main datastream;
  compute main fingerprints from at least some of the main content elements included in the main datastream; and
a control unit configured to select the main content elements from the main datastream based on a comparison of the main fingerprints to the reference fingerprints.

2. The apparatus of claim 1, wherein:
the reference datastream includes no fingerprints of the inserted content elements that are included in the main datastream.

3. The apparatus of claim 2, wherein:
the control unit is configured to cause a channel selector to skip the main datastream during a channel change in response to the reference datastream including no fingerprints of the inserted content elements.

4. The apparatus of claim 1, wherein:
the main fingerprints match the reference fingerprints; and
the control unit is configured to include the main content elements in a rendering of the main datastream in response to the main fingerprints matching the reference fingerprints.

5. The apparatus of claim 1, wherein:
the main fingerprints mismatch the reference fingerprints; and
the control unit is configured to exclude the main content elements from a rendering of the main datastream in response to the main fingerprints mismatching the reference fingerprints.

6. The apparatus of claim 1, wherein:
the comparator unit configures the processor to detect duplicate main fingerprints that match one of the reference fingerprints,
  one of the duplicate main fingerprints being computed from a main content element among the main content elements;
the control unit is configured to exclude the main content element from a rendering of the main datastream in response to the detecting of the duplicate main fingerprints.

7. The apparatus of claim 1 further comprising:
a channel selection unit configured to switch a rendering of the main datastream to render a further datastream in response to a determination that the main fingerprints mismatch the reference fingerprints.

8. The apparatus of claim 7, wherein:
the channel selection unit is configured to restore the rendering of the main datastream in response to a further determination that further main fingerprints match further reference fingerprints.

9. The apparatus of claim 1, wherein:
the main fingerprints match the reference fingerprints; and
the apparatus further comprises
a storage device configured to store the main content elements as a data-reduced version of the main datastream without the inserted content elements.

10. The apparatus of claim 1, wherein:
the reference datastream further contains mark-up information along with the low resolution versions of the main content elements;
the main fingerprints match the reference fingerprints; and
the apparatus further comprises:

a storage device configured to store the received mark-up information with links that correlate the mark-up information to the main content elements.

11. The apparatus of claim 10, wherein:
the mark-up information includes at least one of sub-title, an alternative language channel, a menu, or a chapter marker.

12. The apparatus of claim 1, wherein:
the comparator unit configures the processor to receive the main datastream and the reference datastream from mutually different distribution media.

13. The apparatus of claim 1, wherein:
the main content elements include segments of a motion picture; and
the inserted content elements include commercials.

14. A method comprising:
receiving a main datastream and a reference datastream,
the main datastream including main content elements intermixed with inserted content elements,
the reference datastream having a different data rate than the main datastream and including reference fingerprints of the main content elements of the main datastream;
using a processor, computing main fingerprints from at least some of the main content elements included in the main datastream; and
select the main content elements from the main datastream based on a comparison of the main fingerprints to the reference fingerprints.

15. The method of claim 14, wherein:
the reference datastream contains no fingerprints of the inserted content elements contained in the main datastream.

16. The method of claim 14, wherein:
the selecting of the main content elements is based on a determination that the main fingerprints match the reference fingerprints; and the method further comprises
including the main content elements in a rendering of the main datastream in response to the main fingerprints matching the reference fingerprints.

17. The method of claim 14, wherein:
the selecting of the main content elements is based on a determination that the main fingerprints mismatch the reference fingerprints; and the method further comprises
excluding the main content elements from a rendering of the main datastream in response to the main fingerprints mismatching the reference fingerprints.

18. The method of claim 14, wherein:
detecting duplicate main fingerprints that match one of the reference fingerprints,
one of the duplicate main fingerprints being computed from a main content element among the main content elements;
excluding the main content element from a rendering of the main datastream in response to the detecting of the duplicate main fingerprints.

19. The method of claim 14, wherein:
switching a rendering of the main datastream to render a further datastream in response to a determination that the main fingerprints mismatch the reference fingerprints.

20. The method of claim 19, wherein:
restoring the rendering of the main datastream in response to a further determination that further main fingerprints match further reference fingerprints.

21. The method of claim 14, wherein:
the selecting of the main content elements is based on a determination that the main fingerprints match the reference fingerprints; and the method further comprises
storing the main content elements as a data-reduced version of the main datastream without the inserted content elements.

22. The method of claim 14, wherein:
the reference datastream further contains mark-up information along with the low resolution versions of the main content elements;
the selecting of the main content elements is based on a determination that the main fingerprints match the reference fingerprints; and the method further comprises:
storing the received mark-up information with links that correlate the mark-up information to the main content elements.

23. A non-transitory machine-readable storage medium comprising instructions that, when executed by one or more processors of a machine, cause the machine to perform operations comprising:
receiving a main datastream and a reference datastream,
the main datastream including main content elements intermixed with inserted content elements,
the reference datastream having a different data rate than the main datastream and including reference fingerprints of the main content elements of the main datastream;
computing main fingerprints from at least some of the main content elements included in the main datastream; and
selecting the main content elements from the main datastream based on a comparison of the main fingerprints to the reference fingerprints.

24. An apparatus comprising:
a processor configured by a comparator unit to:
receive a main datastream and a reference datastream,
the main datastream including main content elements intermixed with inserted content elements,
the reference datastream including low resolution versions of the main content elements of the main datastream;
compute main fingerprints from at least some of the main content elements; and
compute reference fingerprints from at least some of the low resolution versions of the main content elements; and
a control unit configured to select the main content elements from the main datastream based on whether the main fingerprints match the reference fingerprints computed from the low resolution versions contained in the reference datastream.

25. The apparatus of claim 24, wherein:
the main fingerprints mismatch the reference fingerprints; and
the control unit is configured to exclude the main content elements from a rendering of the main datastream in response to the main fingerprints mismatching the reference fingerprints.

26. The apparatus of claim 24, wherein:
the comparator unit configures the processor to detect duplicate main fingerprints that match one of the reference fingerprints,
one of the duplicate main fingerprints being computed from a main content element among the main content elements; and the control unit is configured to exclude the main content element from a rendering of the main datastream in response to the detecting of the duplicate main fingerprints.

27. The apparatus of claim 24 further comprising:
a channel selection unit configured to switch a rendering of the main datastream to render a further datastream in response to a determination that the main fingerprints mismatch the reference fingerprints.

28. The apparatus of claim 24, wherein:
the reference datastream contains no low resolution versions of the inserted content elements included in the main datastream.

\* \* \* \* \*